US009565962B2

(12) United States Patent
Chang

(10) Patent No.: US 9,565,962 B2
(45) Date of Patent: Feb. 14, 2017

(54) MULTI-FUNCTIONAL FRUIT AND VEGETABLE SHAPING TOOL

(71) Applicant: Tsung-Chih Chang, Taichung (TW)

(72) Inventor: Tsung-Chih Chang, Taichung (TW)

( * ) Notice: Subject to any disclaimer, the term of this patent is extended or adjusted under 35 U.S.C. 154(b) by 58 days.

(21) Appl. No.: 14/616,288

(22) Filed: Feb. 6, 2015

(65) Prior Publication Data
US 2016/0227954 A1    Aug. 11, 2016

(51) Int. Cl.
A47J 17/02    (2006.01)

(52) U.S. Cl.
CPC ..................................... A47J 17/02 (2013.01)

(58) Field of Classification Search
CPC ............. A47J 17/02–17/04; A47J 17/14; A47J 43/288; A47J 43/25; B26D 3/11; B26D 3/26
USPC .... 30/279.2–279.6, 142, 123.5; 99/588, 590, 99/591, 594
See application file for complete search history.

(56) References Cited

U.S. PATENT DOCUMENTS

| | | | | |
|---|---|---|---|---|
| D630,913 S | * | 1/2011 | Mishan | D7/693 |
| D718,581 S | * | 12/2014 | Exley | D7/695 |
| 2008/0052918 A1 | * | 3/2008 | Sanchez | A47J 17/02 30/279.6 |
| 2014/0158800 A1 | * | 6/2014 | Bordes | A47J 43/255 241/278.2 |
| 2016/0046032 A1 | * | 2/2016 | Schillheim | B26D 3/11 30/151 |
| 2016/0101534 A1 | * | 4/2016 | Schillheim | B26D 3/11 83/423 |

FOREIGN PATENT DOCUMENTS

DE    202015001959 U1 *    4/2015    ............... B26D 3/11

* cited by examiner

Primary Examiner — Laura M Lee
(74) Attorney, Agent, or Firm — Hamre, Schumann, Mueller & Larson, P.C.

(57) ABSTRACT

A multi-functional fruit and vegetable shaping tool includes a main body and a separation member. The main body has a main wall surrounding a receiving space, and a plurality of cutters that have different functions and are formed in the main wall at angularly spaced-apart positions. The separation member is removably disposed in the receiving space to isolate at least one of the cutters that is selected for performing a desired function from the rest of the cutters. The separation member is connected non-rotatably to the main wall and divides the receiving space into an unshielded operative region proximal to the at least one of the cutters, and a shielded inoperative region proximal to the rest of the cutters.

9 Claims, 6 Drawing Sheets

MULTI-FUNCTIONAL FRUIT AND VEGETABLE SHAPING TOOL

FIELD

The disclosure relates to a kitchen utensil, more particularly to a multi-functional fruit and vegetable shaping tool.

BACKGROUND

European Patent No. EP 2 218 561 B1 discloses a device adapted for cutting fruits and vegetables, such as apples, radishes, carrots, beets and cucumbers. The device includes two funnel-shaped bodies with their tapered ends connected to each other to form a narrow through-hole therebetween. Each of the bodies is provided with at least one cutting unit. The cutting units of the device are formed with cutting slots of different widths for cutting the fruits and vegetables into slices or shreds.

However, these cutting units are not easily distinguishable from each other, so that a user may end up using an undesired one of the cutting units for cutting.

SUMMARY

Therefore, the object of the present disclosure is to provide a multi-functional fruit and vegetable shaping tool that may aid users in distinguishing between different functions thereof for convenient operation.

Accordingly, a multi-functional fruit and vegetable shaping tool includes a main body and a separation member. The main body has a main wall surrounding a receiving space, and a plurality of cutters that have different functions and are formed in the main wall at angularly spaced-apart positions. The main wall has a converging open end, a diverging open end opposite to the converging open end, and an inner wall surface extending divergingly from the converging open end to the diverging open end. The cutters extend front the diverging open end to the converging open end. The separation member is removably disposed in the receiving space to isolate at least one of the cutters that is selected for performing a desired function from the rest of the cutters. The separation member is connected non-rotatably to the main wall and divides the receiving space into an unshielded operative region proximal to the at least one of the cutters, and a shielded inoperative region proximal to the rest of the cutters. The separation member has a supporting surface bounding the unshielded operative region and opposite to the shielded inoperative region. The supporting surface has an inner tapering end that is proximal to the at least one of the cutters and the converging open end, and an outer enlarged end that is opposite to the inner tapering end and extending away from the at least one of the cutters to the diverging open end of the main wall.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
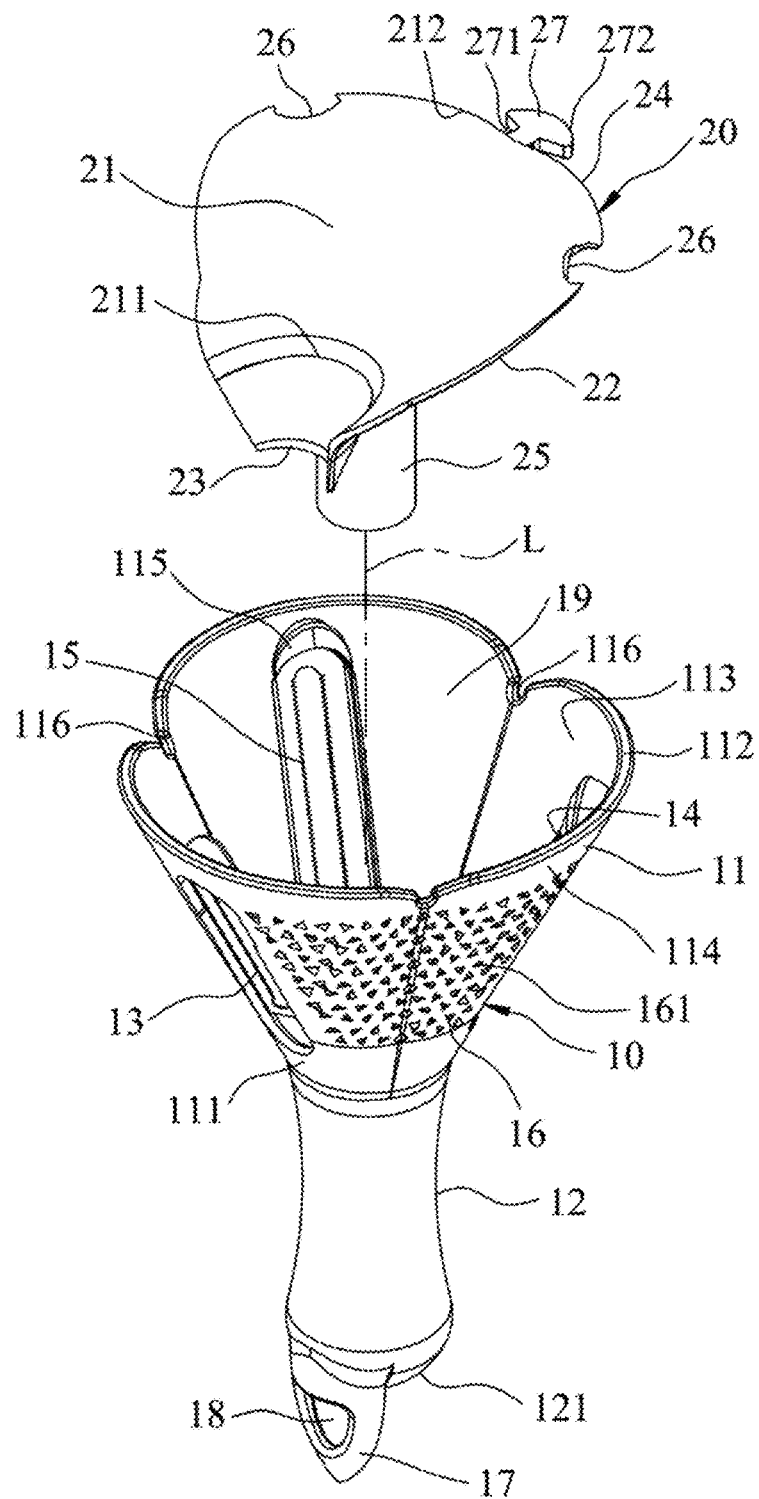
FIG. 1 is an exploded perspective view illustrating an embodiment of a multi-functional fruit and vegetable shaping tool according to the present disclosure.
Figure 2:
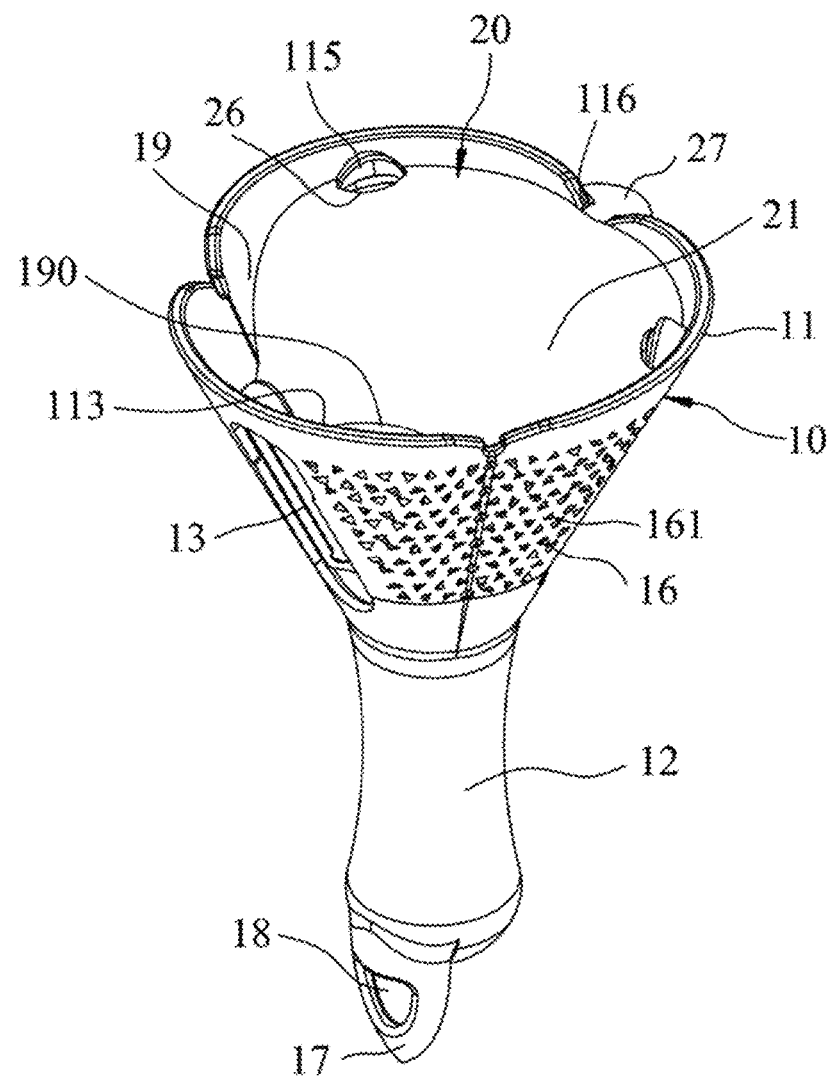
FIG. 2 is an assembled perspective view of the embodiment.
Figure 3:
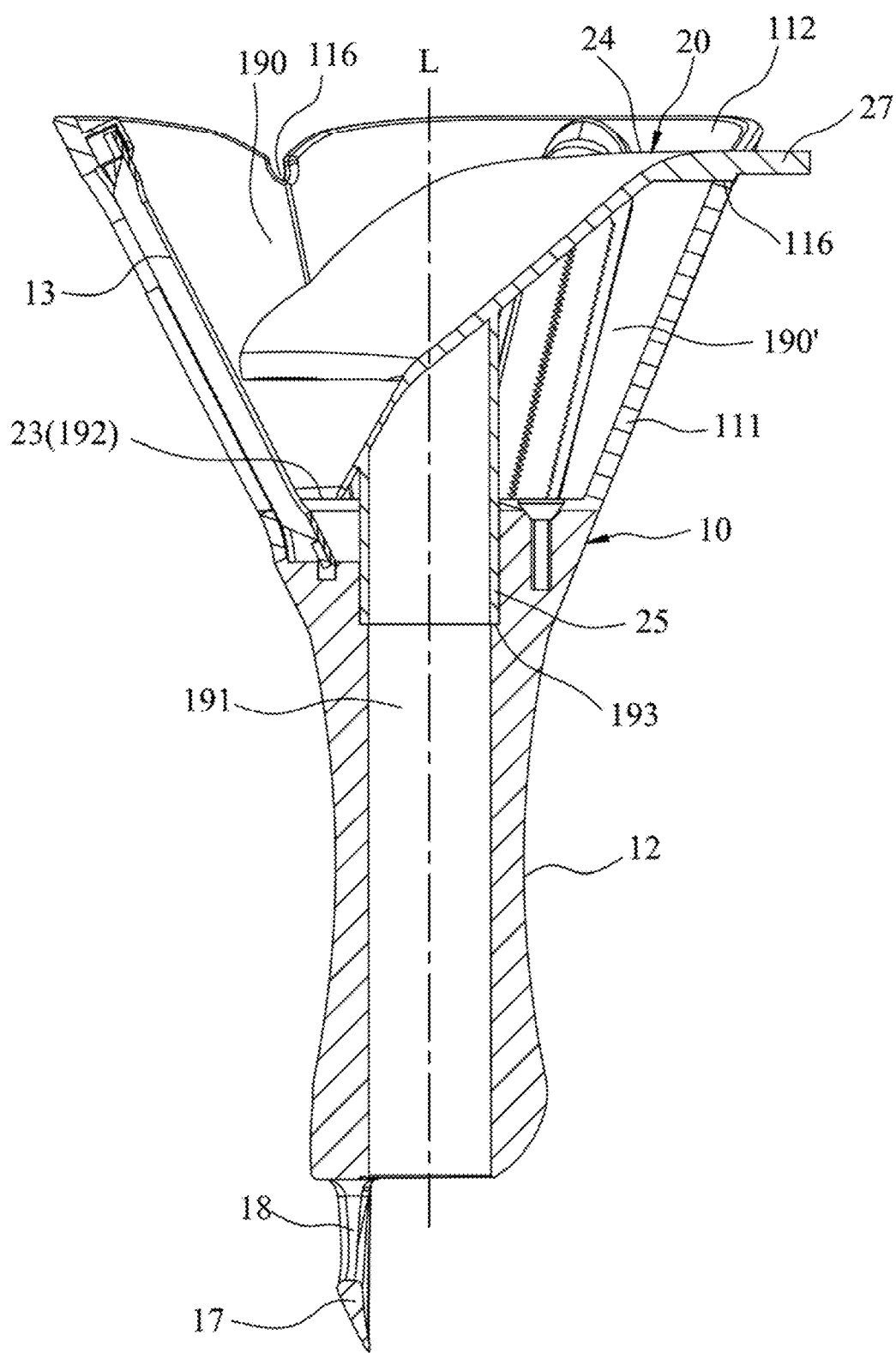
FIG. 3 is a sectional view of the embodiment.
Figure 4:
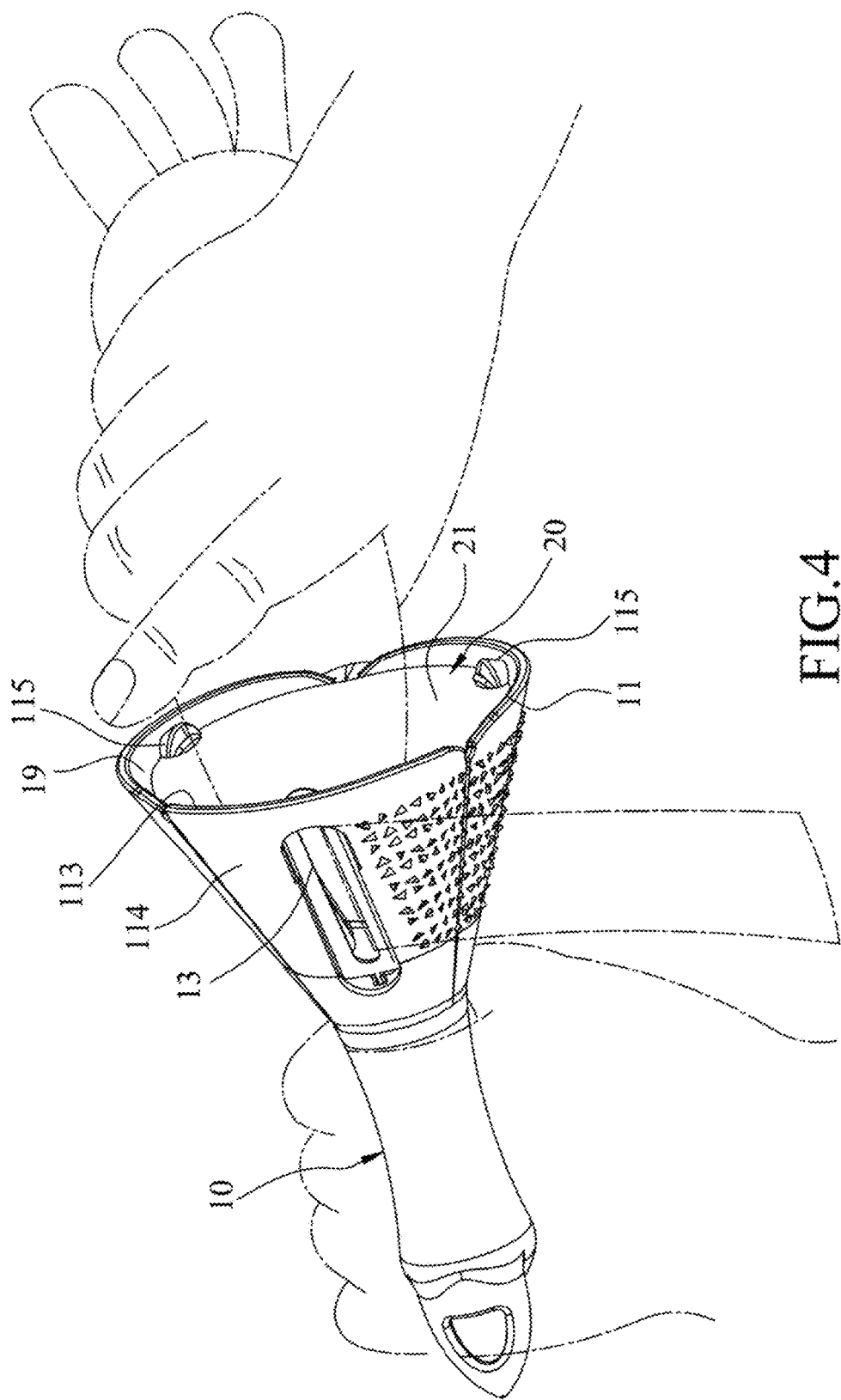
FIG. 4 is a perspective view illustrating an operation of the embodiment to slice a vegetable into an elongated flat strip.

Referring to FIG. 1 to 3, an embodiment of a multi-functional fruit and vegetable shaping tool according to the present disclosure is illustrated. In this embodiment, the fruit and vegetable shaping tool includes a main body 10 and a separation member 20.

The main body 10 has a main wall 11 surrounding a receiving space 19, a handle 12 connected to the main wall 11, a plurality of cutters 13, 14, 15 that have different functions and are formed in the main wall 11 at angularly spaced-apart positions, a grating part 16 formed on the main wall 11, a scraper 1 that is disposed on the handle 12, and a hanging hole 18 formed in the scraper 17.

The main wall 11 has a converging open end 111 connected to the handle 12, a diverging open end 112 opposite to the converging open end 111 along an axis (L), an inner wall surface 113 extending divergingly from the converging open end 111 to the diverging open end 112, an outer wall surface 114 opposite to the inner wall surface 113, a plurality of positioning elements 115 disposed on the inner wall surface 113 proximally to the diverging open end 112, and a plurality of indentations 116 disposed on the diverging open end 112 and alternate with the positioning elements 115. The positioning elements 115 are configured as projections that protrude into the receiving space 19.

The cotters 13, 14, 15 extend from the diverging open end. 112 to the converging open end 111. The cutter 13 is adapted for slicing fruits and vegetables into an elongated flat strip. The cutter 14 is adapted for shredding fruits and vegetables into narrow strips. The cutter 15 is adapted for peeling fruits and vegetables. The grating part 16 has a plurality of granular protrusions 161 protruding from the outer wall surface 114, which is adapted for grating fruits and vegetables into small pieces and mash.

The handle 12 has one end 121 that is opposite to the main wall 11. The scraper 17 is disposed on the end 121 of the handle 12, and has a substantially V-shaped sharp end. The main body 10 further has an internal hole 191 that is formed inside the handle 12 and that is connected to the receiving space 19 in proximity to the converging open end 111, a shoulder 192 that is formed at a juncture of the receiving space 19 and the internal hole 191, and a stepped section 193 that is disposed in the internal hole 191 and that, is spaced apart from the shoulder 192.

In this embodiment, the separation member 20 is removably disposed in the receiving space 19 to isolate one of the cutters 13, 14, 15 that is selected for performing a desired function from the rest of the cutters 13, 14, 15. The separation member 20 is connected non-rotatably to the main wall 11 and divides the receiving space 19 into an unshielded operative region 130 proximal to the one of the cutters 13, 14, 15, and a shielded inoperative region 190' proximal to the rest of the cutters 13, 14, 15.

In this embodiment, the separation member 20 has a supporting surface 21 that bounds the unshielded operative region 190 and that is opposite to the shielded, inoperative region 190', a back surface 22 that is opposite to the supporting surface 21 and that bounds the shielded inoperative region 190', a bottom edge 23 that interconnects the supporting surface 21 and the back surface 22 and that abuts against the shoulder 192, a top edge 24 that is opposite to the bottom edge 23 and that abuts against the main wall 11, an insert tube 23 that projects from the back surface 22 in proximity to the bottom edge 23 and that extends removably into the internal hole 191, two limiting elements 26 that are disposed on the top edge 24 and that interlock releasably with the positioning elements 115, and an engaging tongue 27 that is disposed spacedly from the limiting elements 26 on the top edge 24 and that interlocks releasably with one of the indentations 116 of the main wall 11.

The supporting surface 21 has an inner tapering end 211 that is proximal to the one of the cutters 13, 14, 15 and the converging open end 111, and an outer enlarged end 212 that is opposite to the inner tapering end 211 and that extends away from the one of the cutters 13, 14, 15 to the diverging open end 112 of the main wall 11.

The limiting elements 26 are configured as notches that indent from the top edge 24. The engaging tongue 27 has a neck portion 271 that eat ends from the top edge 24 between the limiting elements 26, and a knob portion 272 that is connected to a distal end of the neck portion 271 and that has a larger width than that of the indentations 116.

Referring to FIGS. 1 to 4 to explain an operation of the fruit and vegetable shaping tool according to the present disclosure, when selecting the cutter 13 for operation, a user may aim the inner tapering end 211 of the supporting surface 21 of the separation member 20 toward the cutter 13, then insert the insert tube 25 into the internal hole 191 through the receiving space 19 until the insert tube 25 abuts against the stepped section 193. At this time, the bottom edge 23 abuts against the shoulder 192, the top edge 24 abuts against the inner wall surface 113 of the main wall 11, and the neck portion 271 of the engaging tongue 27 engages the indentation 116 between two of the positioning elements 115 that, are disposed adjacent to the cutters 14, 15, so that the unshielded operative region 190 is formed to expose the cutter 13 while the shielded operative region 190' is formed to hide the other cutters 14, 15 from view, and that the separation member 20 is immovable relative to the main body ID along the axis (L). Meanwhile, the limiting elements 26 interlock respectively two of the positioning elements 115 that are disposed adjacent to the cutters 14, 15, thereby preventing rotation of the separation member 20 about the axis (L) relative to the main body 10. Afterwards, the user may set a fruit or a vegetable, such as a daikon radish, in the unshielded operative region 190 and abut the fruit or vegetable against the cutter 13, then rotate the fruit or vegetable so that the cutter 13 slices the fruit or vegetable into an elongated fiat strip.

Figure 5:
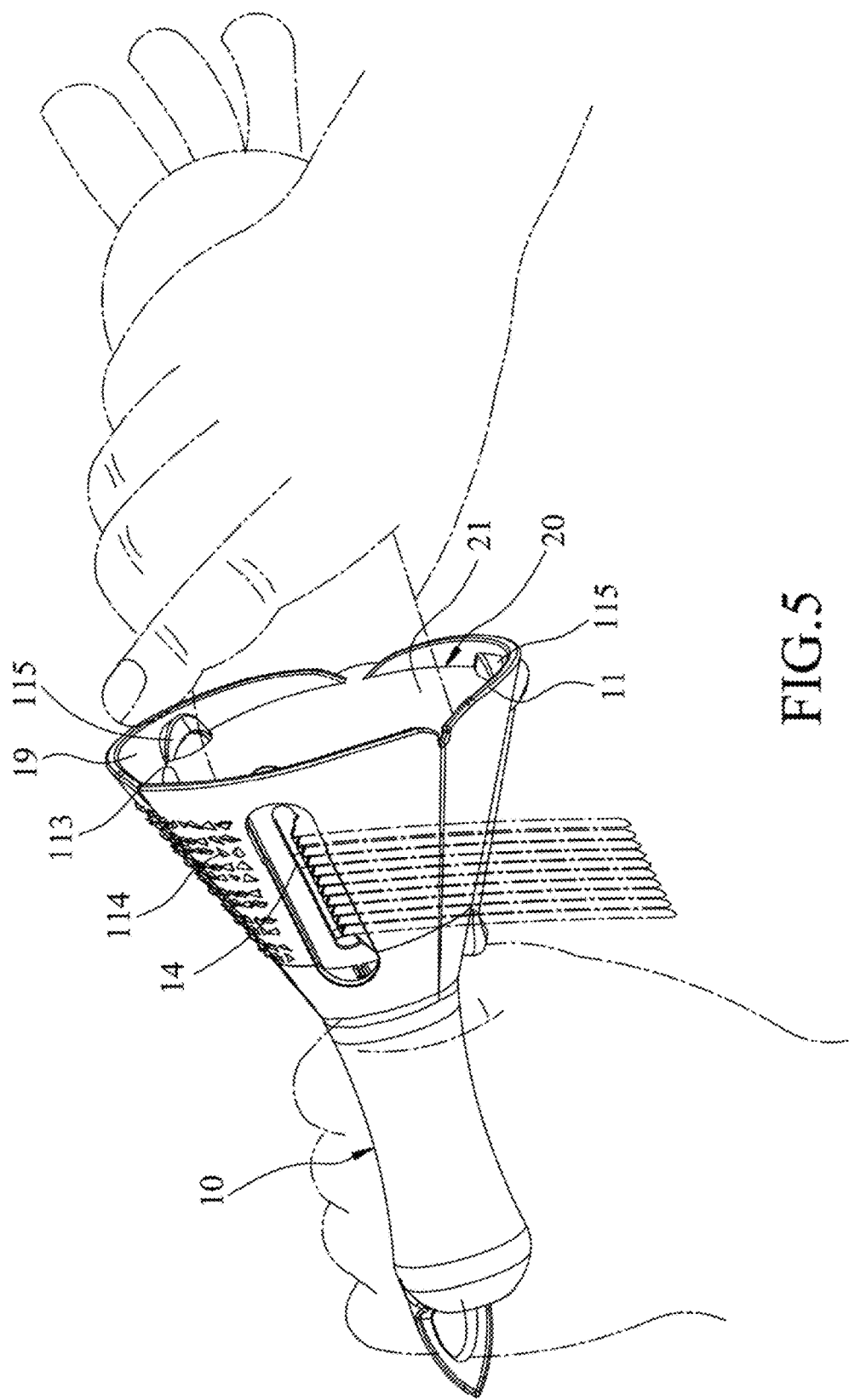
FIG. 5 is a perspective view illustrating an operation of the embodiment to shred the vegetable into narrow strips.

To switch to a different cutting mode, as shown in FIGS. 1 and 5, the user may grab hold of the knob portion 272 of the engaging tongue 27 and disengage the neck portion 271 from the indentation life between the two of the positioning elements 115 that are disposed adjacent to the cutters 14, 15 to unlock the separation member 20, then turn the separation member 20, aim the inner tapering end 211 toward, for example, the cutter 14, and recouple the separation member 20 to the main body 10 with the engaging tongue 27 interlocking with the indentation 116 between the two of the positioning elements 115 that are disposed adjacent to the cutters 13, 15. Similar to the operation of the cutter 13, the user may set the fruit or vegetable in the unshielded operative region 190, which now exposes the cutter 14, then use the cotter 14 to shred the fruit or vegetable into narrow strips.

Figure 6:
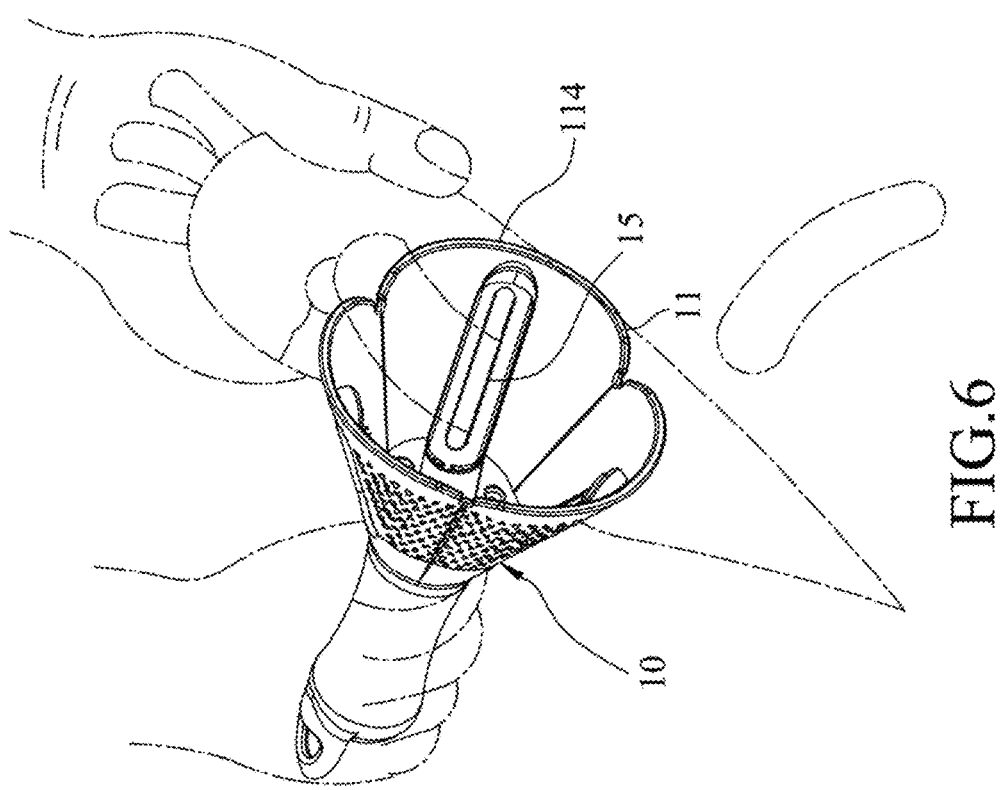
FIG. 6 is a perspective view illustrating an operation of the embodiment to peel the vegetable.

Referring to FIG. 6, an operation of the cutter 15 is illustrated. Unlike the operation of cutters 13, 14, the user may abut the outer wall surface 114 against the fruit or vegetable and peel the fruit or vegetable with the cutter 15.

Moreover, the fruit and vegetable shaping tool according to the present disclosure may also be used to grate the fruits and vegetables using the granular protrusions 161 of the grating part 16, to gouge out stems or damaged areas using the scraper 17, and may be hung using the hanging hole 18 for storage.

As a summary view of the description above, by virtue of the cutters 13, 14, 15, the grating part 16, and the scraper 17, the fruit and vegetable shaping tool according to the present disclosure offers multiple functions for food processing. Moreover, the cooperation of the separation member 20 and the main body 10 provide the fruit and vegetable shaping tool with the ability to isolate a desired one of the cutters 13, 14, 15 in the unshielded operative region 190, thereby facilitating the user in distinguishing the desired one of the cutters 13, 14, 15 from the rest of the cutters 13, 14, 15 and preventing misuse thereof.

While the present invention has been described in connection with what is considered the exemplary embodiment, it is understood that this invention is not limited to the disclosed embodiment but is intended to cover various arrangements included within the spirit and scope of the broadest interpretation so as to encompass ail such modifications and equivalent arrangements.

What is claimed is:

1. A multi-functional fruit and vegetable shaping tool comprising:
   a main body having a main wall that surrounds a receiving space, and a plurality of cutters that have different functions and are formed in said main wall at angularly spaced-apart positions, said main wall having a converging open end, a diverging open end that is opposite to said converging open end, and an inner wall surface that extends divergingly from said converging open end to said diverging open end, said cutters extending from said diverging open end to said converging open end; and
   a separation member removably disposed in said receiving space to isolate at least one of said plurality of cutters that is selected for performing a desired function from the rest of said plurality of cutters, said separation member being connected non-rotatably to said main wall and dividing said receiving space into an unshielded operative region that is proximal to said at least one of said plurality of cutters, and a shielded inoperative region that is proximal to the rest of said plurality of cutters, said separation member having a supporting surface that bounds said unshielded operative region and that is opposite to said shielded inoperative region, said supporting surface having an inner tapering end that is proximal to said at least one of said plurality of cutters and said converging open end, and an outer enlarged end that is opposite to said inner tapering end and extending away from said at least one of said plurality of cutters to said diverging open end of said main wall.

2. The multi-functional fruit and vegetable shaping tool as claimed in claim 1, wherein said main body further has an internal hole connected to said receiving space in proximity to said converging open end, and a shoulder formed at a juncture of said receiving space and said internal hole, said separation member further having a back surface that is opposite to said supporting surface and that bounds said shielded inoperative region, a bottom edge that interconnects said supporting surface and said back surface and that abuts against said shoulder, a top edge that is opposite to said bottom edge and that abuts against said main wall, and an insert tube that projects from said back surface in proximity to said bottom edge and that extends removably into said internal hole.

3. The multi-functional fruit and vegetable shaping tool as claimed in claim 2, wherein said main body further has a plurality of positioning elements disposed on said main wall proximally to said diverging open end, said separation member further having a plurality of limiting elements that are disposed on said top edge and that interlock releasably with said plurality of positioning elements.

4. The multi-functional fruit and vegetable shaping tool as claimed in claim 3, wherein said plurality of positioning elements are configured as projections that protrude into said receiving space, and said plurality of limiting elements are configured as notches that indent from said top edge.

5. The multi-functional fruit and vegetable shaping tool as claimed in claim 4, wherein said main body further includes a plurality of indentations disposed on said diverging open end and alternating with said plurality of positioning elements, said separation member further having an engaging tongue that is disposed spacedly from said plurality of limiting elements on said top edge and that interlocks releasably with one of said plurality of indentations.

6. The multi-functional fruit and vegetable shaping tool as claimed in claim 5, wherein said main body further includes a handle connected to said converging open end of said main wall, said internal hole being formed inside said handle.

7. The multi-functional fruit and vegetable shaping tool as claimed in claim 6, wherein said handle has one end opposite to said main wall, said main body further including a scraper that is disposed on said one end of said handle and that has a substantially V-shaped sharp end.

8. The multi-functional fruit and vegetable shaping tool as claimed in claim 7, wherein said main body further includes a hanging hole formed in said scraper.

9. The multi-functional fruit and vegetable shaping tool as claimed in claim 1, wherein said main wall further has an outer wall surface opposite to said inner wall surface, said main body further having a grating part that has a plurality of granular protrusions protruding from said outer wall surface of said main wall.

* * * * *